United States Patent
Fujiwaki et al.

(10) Patent No.: US 12,516,195 B2
(45) Date of Patent: Jan. 6, 2026

(54) ELECTRODE AND METHOD FOR PRODUCING THE SAME

(71) Applicants: Murata Manufacturing Co., Ltd., Nagaokakyo (JP); The Trustees of the University of Pennsylvania, Philadelphia, PA (US)

(72) Inventors: Mika Fujiwaki, Nagaokakyo (JP); Takeshi Torita, Nagaokakyo (JP); Kosuke Sugiura, Nagaokakyo (JP); Brendan Boyce Murphy, Nagaokakyo (JP); Flavia Vitale, Wilmington, DE (US)

(73) Assignees: MURATA MANUFACTURING CO., LTD., Nagaokakyo (JP); THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 26 days.

(21) Appl. No.: 18/413,752

(22) Filed: Jan. 16, 2024

(65) Prior Publication Data
US 2024/0209211 A1    Jun. 27, 2024

Related U.S. Application Data

(63) Continuation of application No. PCT/JP2022/027741, filed on Jul. 14, 2022.
(Continued)

(51) Int. Cl.
*C09C 1/36*    (2006.01)
*A61B 5/263*    (2021.01)
(Continued)

(52) U.S. Cl.
CPC ............... *C09C 1/36* (2013.01); *A61B 5/263* (2021.01); *C09C 3/003* (2013.01); *C09C 3/006* (2013.01);
(Continued)

(58) Field of Classification Search
None
See application file for complete search history.

(56) References Cited

FOREIGN PATENT DOCUMENTS

| CN | 108384448 B | 10/2019 |
| CN | 112038601 A | 12/2020 |

(Continued)

OTHER PUBLICATIONS

Alhabeb et al., "Guidelines for Synthesis and Processing of Two-Dimensional Titanium Carbide Ti3C2Tx MXene," Chemistry of Materials, 2017, vol. 29, pp. 7633-7644.
(Continued)

*Primary Examiner* — Khanh T Nguyen
(74) *Attorney, Agent, or Firm* — ArentFox Schiff LLP (57) ABSTRACT

An electrode including: a conductive film which contains: a layered material having one or plural layers of particles of a layer body represented by: $M_m X_n$ (M is at least one metal of Group 3, 4, 5, 6, or 7, X is a carbon atom, a nitrogen atom, or a combination thereof, n is not less than 1 and not more than 4, and m is more than n but not more than 5), and a modifier or terminal T existing on a surface of the layer body, (T is at least one selected from a hydroxyl group, a fluorine atom, a chlorine atom, an oxygen atom, and a hydrogen atom); and a π-electron conjugated compound attached to the particles and having at least one selected from the group consisting of an aromatic ring, a heteroaromatic ring, a conjugated diene unit, an allyl group, and a vinyl group.

12 Claims, 2 Drawing Sheets

Related U.S. Application Data (60) Provisional application No. 63/223,292, filed on Jul. 19, 2021.

(51) Int. Cl.
    *C09C 3/00*    (2006.01)
    *C09C 3/06*    (2006.01)
    *C09C 3/08*    (2006.01)

(52) U.S. Cl.
    CPC .............. *C09C 3/063* (2013.01); *C09C 3/08* (2013.01); *A61B 2562/125* (2013.01); *C01P 2004/24* (2013.01); *C01P 2004/80* (2013.01); *C01P 2006/40* (2013.01)

(56) References Cited

FOREIGN PATENT DOCUMENTS

| WO | 2019055784 A1 | 3/2019 |
|---|---|---|
| WO | 2020086548 A1 | 4/2020 |

OTHER PUBLICATIONS

Guo et al., "A binder-free electrode based on Ti3C2Tx-rGO aerogel for supercapacitors," Colloids and Surfaces A: Physicochemical and Engineering Aspects, Jun. 20, 2020, vol. 595, No. 124683, pp. 1-5.

Han et al., "Oxidized titanium carbide MXene-enabled photoelectrochemical sensor for quantifying synergistic interaction of ascorbic acid based antioxidants system," Biosensors and Bioelectronics, Apr. 1, 2021, vol. 177, No. 112978, pp. 1-6.

International Search Report in PCT/JP2022/027741, mailed Oct. 11, 2022, 3 pages.

Shankar et al., "Electrochemical Determination of Adrenaline Using MXene/Graphite Composite Paste Electrodes," ACS Applied Materials & Interfaces, 2018, vol. 10, pp. 43343-43551.

Sharifuzzaman et al., "Smart bandage with integrated multifunctional sensors based on MXene-functionalized porous graphene scaffold for chronic wound care management," Biosensors and Bioelectronics, 2020, vol. 169, pp. 1-12.

Wang et al., "Engineering rGO/MXene Hybrid Film as an Anode Host for Stable Sodium-Metal Batteries," Energy Fuels, 2021, vol. 35, pp. 4587-4595.

You et al., "Simultaneous Recognition of Dopamine and Uric Acid in the Presence of Ascorbic Acid via an Intercalated MXene/PPy Nanocomposite," Sensors, 2021, vol. 21, No. 3069, pp. 1-12.

ELECTRODE AND METHOD FOR PRODUCING THE SAME

CROSS REFERENCE TO RELATED APPLICATIONS

The present application is a continuation of International application No. PCT/JP2022/027741, filed Jul. 14, 2022, which claims priority to U.S. Provisional Patent Application No. 63/223,292, filed Jul. 19, 2021, the entire contents of each of which are incorporated herein by reference.

TECHNICAL FIELD

The present disclosure relates to an electrode and a method for producing the same.

BACKGROUND ART

In recent years, MXene has been attracting attention as a new material having conductivity. MXene is a type of so-called two-dimensional material, and as will be described later, is a layered material in the form of one or plural layers. In general, MXene is in the form of particles (which can include powders, flakes, nanosheets, and the like) of such a layered material.

Currently, various studies are being conducted toward the application of MXene to various electric devices. For example, WO 2019/055784 A ("Patent Literature 1") discloses an electrode having a contact material containing MXene and exhibiting impedance lower than that of Au as an electric device.

SUMMARY OF THE INVENTION

However, since the conductivity of MXene may be deteriorated over time (for example, in about several days to one month), it has been required to maintain excellent electrode characteristics such as high conductivity for a long period of time. The present disclosure has been made in view of the above circumstances, and an object of the present disclosure is to provide an electrode capable of maintaining excellent electrode characteristics for a long period of time, and a method for producing the same.

According to one aspect of the present invention, there is provided an electrode containing a conductive film which comprises:

a material having one or plural layers of particles of a layer body represented by:

wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T existing on a surface of the layer body, wherein T is at least one selected from the group consisting of a hydroxyl group, a fluorine atom, a chlorine atom, an oxygen atom, and a hydrogen atom; and a π-electron conjugated compound attached to the particles, the π electron conjugated compound having at least one selected from the group consisting of an aromatic ring, a heteroaromatic ring, a conjugated diene unit, an allyl group, and a vinyl group.

According to another aspect of the present invention, there is provided a method for producing an electrode, the method including:

(a) preparing a precursor of a conductive film, the precursor represented by:

wherein M is at least one metal of Group 3, 4, 5, 6, or 7, X is a carbon atom, a nitrogen atom, or a combination thereof, A is at least one element of Group 12, 13, 14, 15, or 16, n is not less than 1 and not more than 4, and m is more than n but not more than 5;

(b) removing at least a part of the A atoms from the precursor using an etching liquid to obtain a first intermediate;

(c) washing the first intermediate with water to obtain a second intermediate;

(d) performing an intercalation by mixing the second intermediate with a compound for inter-layer insertion of the second intermediate to obtain a third intermediate;

(e) stirring the third intermediate in a liquid to obtain a fourth intermediate;

(f) washing the fourth intermediate with water to obtain particles;

(g) mixing the particles with a π-electron conjugated compound having at least one selected from the group consisting of an aromatic ring, a heteroaromatic ring, a conjugated diene unit, an allyl group, and a vinyl group to form a layered material with the π-electron conjugated compound attached thereto; and (h) supplying the layered material with the π-electron conjugated compound attached thereto on a substrate to form a conductive film.

According to the present invention, an electrode includes particles of a predetermined layered material (also referred to as "MXene" in the present specification) including one or plural layers and attached to the π-electron conjugated compound, thereby maintaining stable electrode characteristics for a long period of time with MXene.

BRIEF DESCRIPTION OF THE DRAWINGS

FIGS. 1(a) and 1(b) are schematic cross-sectional views illustrating MXene which is a layered material usable for a conductive film of an electrode in the present embodiment, in which FIG. 1(a) illustrates single-layered MXene, and FIG. 1(b) illustrates multi-layered (exemplarily two-layered) MXene.

DETAILED DESCRIPTION OF THE PREFERRED EMBODIMENTS

Embodiment 1: Electrode

Hereinafter, an electrode in one embodiment of the present invention will be described in detail, but the present invention is not limited to such an embodiment.

The electrode according to the present embodiment includes: a conductive film which comprises:
a material having one or plural layers of particles of a layer body represented by:

$$M_mX_n$$

wherein M is at least one metal of Group 3, 4, 5, 6, or 7, X is a carbon atom, a nitrogen atom, or a combination thereof, n is not less than 1 and not more than 4, and m is more than n but not more than 5, and
a modifier or terminal T existing on a surface of the layer body, wherein T is at least one selected from the group consisting of a hydroxyl group, a fluorine atom, a chlorine atom, an oxygen atom, and a hydrogen atom; and
a π-electron conjugated compound attached to the particles, the π electron conjugated compound having at least one selected from the group consisting of an aromatic ring, a heteroaromatic ring, a conjugated diene unit, an allyl group, and a vinyl group.

The electrode can maintain stable electrode characteristics for a long period of time by having the conductive film. For example, low impedance can be secured as electrode characteristics, for example. More specifically, for example, under a biological environment, it is possible to suppress an increase in initial impedance of the electrode and to suppress an increase in impedance over time.

The layered material can be understood as a layered compound and is also denoted "$M_mX_nT_s$", in which s is an optional number, and in the related art, x or z may be used instead of s. Typically, n may be, but is not limited to, 1, 2, 3, or 4.

In the above formula of MXene, M is preferably at least one selected from the group consisting of Ti, Zr, Hf, V, Nb, Ta, Cr, Mo, and Mn, and more preferably at least one selected from the group consisting of Ti, V, Cr, and Mo.

MXene is known that the above formula: $M_mX_n$ is expressed as follows: $Sc_2C$, $Ti_2C$, $Ti_2N$, $Zr_2C$, $Zr_2N$, $Hf_2C$, $Hf_2N$, $V_2C$, $V_2N$, $Nb_2C$, $Ta_2C$, $Cr_2C$, $Cr_2N$, $Mo_2C$, $Mo_{1.3}C$, $Cr_{1.3}C$, $(Ti,V)_2C$, $(Ti,Nb)_2C$, $W_2C$, $W_{1.3}C$, $Mo_2N$, $Nb_{1.3}C$, $Mo_{1.3}Y_{0.6}C$ (in the above formula, "1.3" and "0.6" mean about 1.3 (=4/3) and about 0.6 (=2/3), respectively.); $Ti_3C_2$, $Ti_3N_2$, $Ti_3$ (CN), $Zr_3C_2$, $(Ti, V)_3C_2$, $(Ti_2Nb)$ $C_2$, $(Ti_2Ta)$ $C_2$, $(Ti_2Mn)$ $C_2$, $Hf_3C_2$, $(Hf_2V)$ $C_2$, $(Hf_2Mn)$ $C_2$, $(V_2Ti)$ $C_2$, $(Cr_2Ti)C_2$, $(Cr_2V)C_2$, $(Cr_2Nb)C_2$, $(Cr_2Ta)C_2$, $(Mo_2Sc)C_2$, $(Mo_2Ti)C_2$, $(Mo_2Zr)$ $C_2$, $(Mo_2Hf)$ $C_2$, $(Mo_2V)$ $C_2$, $(Mo_2Nb)$ $C_2$, $(Mo_2Ta)$ $C_2$, $(W_2Ti)$ $C_2$, $(W_2Zr)$ $C_2$, $(W_2Hf)$ $C_2$; $Ti_4N_3$, $V_4C_3$, $Nb_4C_3$, $Ta_4C_3$, $(Ti,Nb)_4C_3$, $(Nb, Zr)_4C_3$, $(Ti_2Nb_2)$ $C_3$, $(Ti_2Ta_2)$ $C_3$, $(V_2Ti_2)$ $C_3$, $(V_2Nb_2)$ $C_3$, $(V_2Ta_2)$ $C_3$, $(Nb_2Ta_2)$ $C_3$, $(Cr_2Ti_2)C_3$, $(Cr_2V_2)C_3$, $(Cr_2Nb_2)C_3$, $(Cr_2Ta_2)C_3$, $(Mo_2Ti_2)C_3$, $(Mo_2Zr_2)C_3$, $(Mo_2Hf_2)C_3$, $(Mo_2V_2)C_3$, $(Mo_2Nb_2)C_3$, $(Mo_2Ta_2)C_3$, $(W_2Ti_2)C_3$, $(W_2Zr_2)C_3$, $(W_2Hf_2)$ $C_3$, $(Mo_{2.7}V_{1.3})C_3$ (in the above formula, "2.7" and "1.3" mean about 2.7 (=8/3) and about 1.3 (=4/3), respectively.)

Typically, in the above formula, M may be titanium or vanadium and X may be a carbon atom or a nitrogen atom. For example, the MAX phase that is a precursor of MXene is $Ti_3AlC_2$, and MXene is $Ti_3C_2T_s$ (in other words, M is Ti, X is C, n is 2, and m is 3).

In the present embodiment, MXene may contain a relatively small amount of remaining A atoms, for example, 10% by mass or less with respect to the original A atoms. The residual amount of A atoms may be preferably 8% by mass or less, and more preferably 6% by mass or less.

However, even if the residual amount of A atoms exceeds 10% by mass, there may be no problem depending on the application and use conditions of the electrode.

Figure 1A:
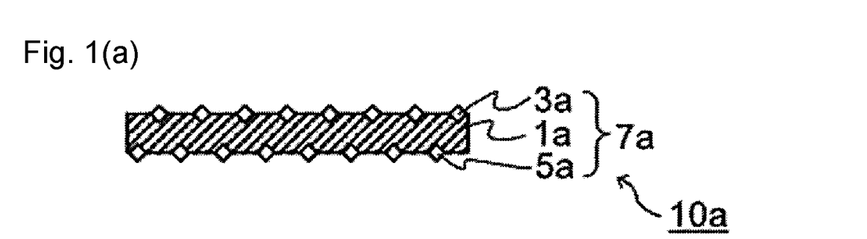
Figure 1B:
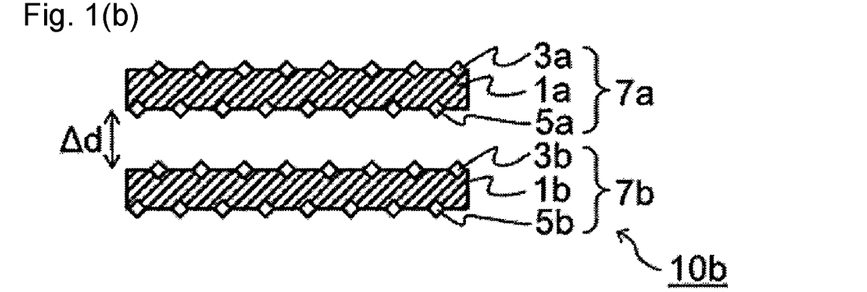

Hereinafter, particles of a layered material (also referred to as "MXene particles") constituting the conductive film in the electrode according to the present embodiment will be described with reference to FIGS. 1(a) and 1(b). In FIGS. 1(a) and 1(b), the π-electron conjugated compound is not illustrated in order to describe the particles of the layered material for attaching the π-electron conjugated compound.

The particles of the layered material constituting the conductive film of the present embodiment are aggregates containing one layer of MXene 10a (single layer MXene) schematically illustrated in FIG. 1(a). More specifically, MXene 10a is an MXene layer 7a having layer body ($M_mX_n$ layer) 1a represented by $M_mX_n$, and modifier or terminals T 3a and 5a existing on the surface (more specifically, at least one of two surfaces facing each other in each layer) of the layer body 1a. Therefore, the MXene layer 7a is also represented as "$M_mX_nT_s$", and s is an optional number.

The particles of the layered material according to the present embodiment may include one or plural layers. Examples of the MXene (multilayer MXene) of the plural layers include, but are not limited to, two layers of MXene 10b as schematically illustrated in FIG. 1 (b). 1b, 3b, 5b, and 7b in FIG. 1(b) are the same as 1a, 3a, 5a, and 7a in FIG. 1(a) described above. Two adjacent MXene layers (for example, 7a and 7b) of the multilayer MXene do not necessarily have to be completely separated from each other, and may be partially in contact with each other. The MXene 10a may be one in which the multilayer MXene 10b are individually separated and exist in one layer. The MXene 10 may be a mixture of the single layer MXene 10a and the multilayer MXene 10b in which the unseparated multilayer MXene 10b remains. Even when the multilayer MXene is included, the multilayer MXene is preferably MXene having a few-layer obtained through the delamination treatment. The term "the number of layers is small" means that, for example, the number of stacked layers of MXene is not more than ten. Hereinafter, the "multilayer MXene having a few-layer" may be referred to as a "few-layer MXene" in some cases. The thickness of the few-layer MXene in the lamination direction is preferably not more than 10 nm. In addition, the single layer MXene and the few-layer MXene may be collectively referred to as "single layer/few-layer MXene" in some cases.

The particles of the layered material according to the present embodiment preferably contain a large amount of single layer/few-layer MXene. By containing a large amount of the single layer/few-layer MXene, the specific surface area of MXene can be made larger than that of the multilayer MXene, and as a result, as shown in examples described later, deterioration of electrode characteristics over time can be further suppressed. For example, in the particles of the layered material according to the present embodiment, the single layer/few-layer MXene, in which the number of laminated layers of MXene is not more than 10 layers and the thickness is preferably not more than 10 nm, accounts for preferably not less than 80% by volume, more preferably not less than 90% by volume, and still more preferably not less than 95% by volume of the total MXene. In addition, the volume of the single layer MXene is more preferably larger than the volume of the few-layer MXene. Since the true density of these MXenes does not greatly vary depending on the existence form, it can be said that it is more preferable that the mass of the single layer MXene is larger than the mass of the few-layer MXene. When these relationships are satisfied, the specific surface area can be further increased, and the deterioration of the electrode characteristics over time can be further suppressed. Most preferably, the particles of the layered material according to the present embodiment is formed only of the single layer MXene.

Although the present embodiment is not limited, the thickness of each layer of MXene (which corresponds to the MXene layers 7a and 7b) can be, for example, not less than 1 nm and not more than 30 nm, for example, it may be not less than 1 nm and not more than 5 nm, and not less than 1 nm and not more than 3 nm (which may mainly vary depending on the number of M atom layers included in each layer). For the individual laminates of the multilayer MXene that can be included, the interlayer distance (alternatively, a void dimension is indicated by Δd in FIG. 1(*b*)) is, for example, not less than 0.8 nm and not more than 10 nm, particularly not less than 0.8 nm and not more than 5 nm, and more particularly about 1 nm, and the total number of layers can be not less than 2 and not more than 20,000.

In the electrode of the present embodiment, a π-electron conjugated compound (also referred to as a "sacrificial oxidizing agent") adheres to particles of a layered material including one or plural layers included in the conductive film.

Figure 2:
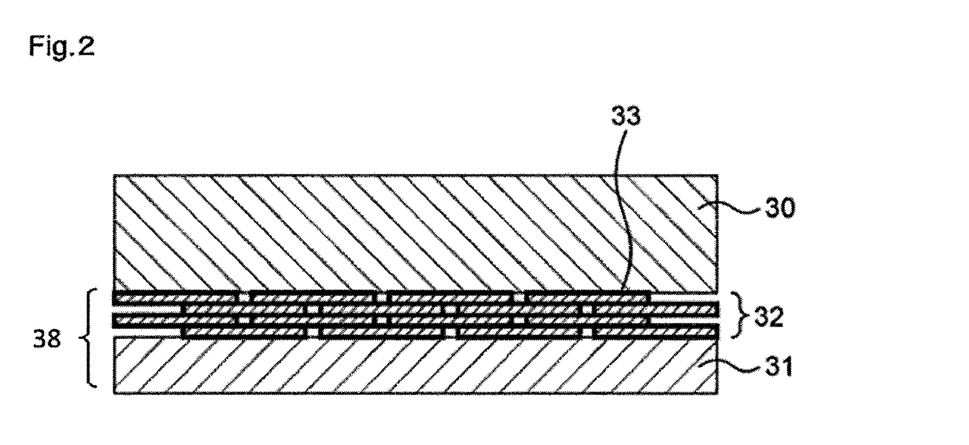
FIG. 2 is a schematic cross-sectional view for explaining an action and effect of one embodiment of the electrode of the present embodiment.
Figure 3:
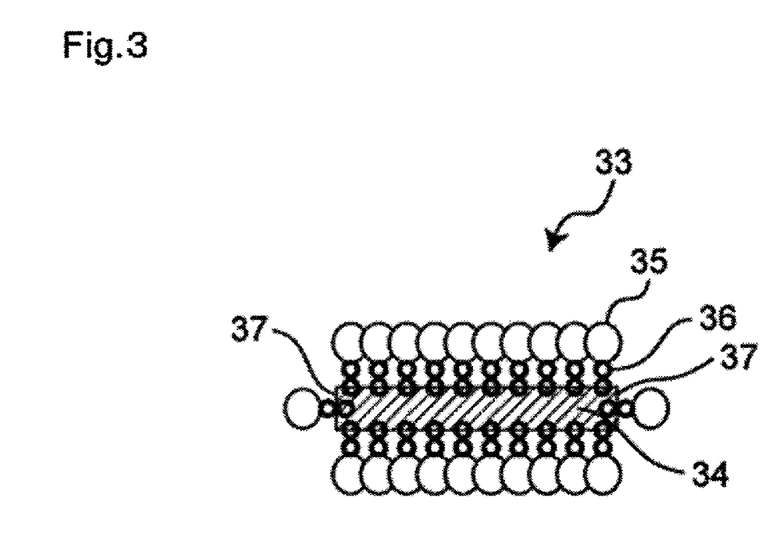
FIG. 3 is another schematic cross-sectional view for explaining an action and effect of one embodiment of the electrode of the present embodiment.

FIG. 2 is a schematic cross-sectional view in a case where a substrate 31 is included and a biological tissue 30 is used as a subject as an embodiment of the electrode of the present embodiment. Examples of the measurement target in the biological tissue 30 include blood vessels, muscles, brains, and other organs under the skin in addition to the skin such as a human body. The measurement may be performed by bringing an electrode into direct contact with the measurement target, or for example, the measurement target under the skin may be measured indirectly by bringing an electrode into contact with the skin. FIG. 2 is a schematic cross-sectional view in a case where a conductive film 32 is constituted by π-electron conjugated compound-attached particles 33, that is, particles (MXene particles) 34 of a layered material attached to the π-electron conjugated compound 35. In addition, FIG. 3 is an enlarged view of one of the particles (MXene particles) 34 of the layered material attached to the π-electron conjugated compound 35. In FIGS. 2 and 3, the entire periphery of the cross section of the particles (MXene particles) 34 of the layered material is covered with the π-electron conjugated compound 35, but the present invention is not limited thereto, and the π-electron conjugated compound 35 may be attached to at least a part of the particles (MXene particles) 34 of the layered material. In addition, in FIG. 3, a bond 36 between the π electrons of the particles (MXene particles) 34 of the layered material constituting the conductive film 32 and the π electrons of the π-electron conjugated compound 35 is exaggeratedly shown for the purpose of description of the action and effect, and originally, a gap formed by the bond 36 in FIG. 3 is not formed between the particles (MXene particles) 34 of the layered material and the π-electron conjugated compound 35, and the particles (MXene particles) 34 of the layered material and the π-electron conjugated compound 35 are substantially in contact with each other.

As illustrated in FIGS. 2 and 3, the π-electron conjugated compound is attached to the particles (MXene particles) of the layered material so as to cover particularly an oxidation site (mainly the edge) 37 of the MXene particles 34, so that the oxidation is prevented. Further, bonding between the MXene particles 34 and the π-electron conjugated compound 35 by π electrons can secure a conductive path, and furthermore, the π-electron conjugated compound reacts with water, oxygen, or the like from the outside, that is, is sacrificial oxidized to prevent oxidation of MXene by water, oxygen, or the like from the outside. As a result, excellent electrode characteristics such as maintenance of high conductivity, suppression of an increase in initial impedance, and suppression of a temporal increase in impedance can be realized. The biological tissue 30, for example, the skin of the human body and the electrode 38 are brought into direct contact with each other as illustrated in FIG. 2, and a gel or a porous membrane (not shown) capable of permeating ions may be present between the biological tissue 30 and the electrode 38.

The π-electron conjugated compound according to the present embodiment has one or more of an aromatic ring, a heteroaromatic ring, a conjugated diene unit, an allyl group, and a vinyl group. The π-electron conjugated compound is preferably one or more compounds selected from the group consisting of ascorbic acid, erythorbic acid, dibutylhydroxytoluene, tocopherol, butylhydroxyanisole, catechin, and a catechin derivative. These compounds can be attached to almost each of the MXene particles according to the present embodiment, and are all sacrificial oxidized to form a bond with the MXene particles by π electrons.

Examples of the catechin derivative include catechin gallate, epicatechin, epicatechin gallate, gallocatechin, gallocatechin gallate, epigallocatechin, and epigallocatechin gallate. As the compound, from the viewpoint of suppressing aggregation of MXene particles in a liquid and easily forming the conductive film according to the present embodiment, for example, it is not preferable to use ascorbate and erythorbate which are likely to disturb the charge balance of MXene particles due to the presence of metal ions, and it is preferable to use ascorbic acid having protons and erythorbic acid having protons. The π-electron conjugated compound is more preferably ascorbic acid (L-ascorbic acid).

In order to sufficiently exhibit the effect of the π-electron conjugated compound, the ratio of the total amount of the π-electron conjugated compound to the total amount of the particles of the layered material is preferably in a range of not less than 0.001% by mass and not more than 10% by mass. The ratio may be, for example, 0.01% by mass or more, or 0.1% by mass or more. From the viewpoint of sufficiently exhibiting the conductivity inherent in the conductive film, the ratio is preferably 5% by mass or less.

The thickness of the particles of the layered material attached to the π-electron conjugated compound is preferably not less than 1 nm and not more than 30 μm, and the total thickness of the particles of the layered material having the π-electron conjugated compound attached thereto is preferably not less than 1 nm and not more than 1 μm.

The surfaces of the particles of the layered material may not be completely covered with the π-electron conjugated compound, and the π-electron conjugated compound is preferably attached to preferably 20% by area or more, more preferably 50% by area or more, and still more preferably 80% by area or more of the surfaces of the particles of the layered material. The particles of the layered material including the one or plural layers are preferably covered with a π-electron conjugated compound, and for example, are preferably covered at the above ratio.

The number-average value of a feret diameter of the particles of the layered material contained in the conductive film according to the present embodiment is preferably 3 μm or more. As described above, the shape of the particles of the layered material has a plane, and as the plane region is larger, the number of end faces (edges) of the particles of the layered material, which are likely to form oxidation sites, is relatively reduced, and it can be expected that the in-plane orientation of the entire coating film is improved. As a result, the π-electron conjugated compound is also easily attached, a large number of π bonds between the MXene particles and the π-electron conjugated compound are easily formed, the conductivity is increased, and for example, the deterioration of the electrode characteristics over time such as an increase in the impedance over time can be further suppressed. In the present specification, the size of the planar portion of the particles of the layered material is defined by the number-average value of a feret diameter. The number-average value of a feret diameter is more preferably 4 μm or more. The number-average value of a feret diameter is preferably as large as possible from the viewpoint of maintaining excellent electrode characteristics over a long period of time, but the upper limit of the number-average value of a feret diameter is about 50 μm in consideration of production efficiency and the like. Examples of the method for measuring the feret diameter include a method for measuring the feret diameter at a stage of producing the MXene particles, that is, using the MXene slurry, and a method for measuring the feret diameter of the MXene particles by removing the x-electron conjugated compound from the MXene particles attached to the π-electron conjugated compound. The number-average value of a feret diameter can be determined using a scanning electron microscope (SEM) or an atomic force microscope (AFM) as shown in examples described later.

The electrode of the present embodiment may include a conductive film containing particles of a layered material including one or plural layers, attached to a π-electron conjugated compound, and is not limited to a specific form. Examples of the electrode include an electrode in a solid state and an electrode in a flexible and soft state. The thickness of the particles of the layered material and the thickness of the π-electron conjugated compound in the electrode can be measured by, for example, measurement with a micrometer, cross-sectional observation by a method such as a scanning electron microscope (SEM), a microscope, or a laser microscope.

One of the characteristics of the electrode of the present embodiment is impedance. The initial impedance is preferably as small as possible, and is preferably smaller within a range of 80 kΩcm$^2$ or less at 10 Hz and 10 kΩcm$^2$ or less at 1 kHz, for example, according to measurement conditions shown in examples described later.

In the electrode of the present embodiment, the conductive film may be exposed to the outside air so as to be brought into direct contact with an object to be measured, or as another laminate, a gel capable of permeating ions, a film including a porous membrane, or the like may be formed. The porous membrane may be a membrane having a large number of fine pores and capable of selectively transmitting ions and molecules having a size smaller than a pore diameter. The materials for these other laminates are not particularly limited and may be formed of organic materials, inorganic materials, or mixtures thereof. Polymers such as hydrophilic polymers as the organic materials, and ceramics as the inorganic materials, or a combination thereof can be exemplified. The film thickness of the other laminates may be, for example, not less than 0.1 μm and not more than 300 μm. The porous membrane may have, for example, an average pore diameter of not less than 1 nm and not more than 1 μm. The porous membrane may be, for example, an aggregated particulate porous membrane, a network porous membrane, a fibrous porous membrane, a porous membrane having a plurality of isolated and/or communicating pipe holes, a porous membrane having a honeycomb structure, or the like, depending on the pore shape.

When the electrode of the present embodiment includes a substrate, the conductive film and the substrate may be brought into direct contact with each other. The material of the substrate is not particularly limited. The substrate may be formed of a conductive material. Examples of the conductive material include at least one material of metal materials such as gold, silver, copper, platinum, nickel, titanium, tin, iron, zinc, magnesium, aluminum, tungsten, and molybdenum, and a conductive polymer. The substrate may include a conductive film, such as a metal film, different from the conductive film according to the present embodiment on a contact surface with the conductive film according to the present embodiment. Alternatively, the substrate may be formed of an organic material. Examples of the organic material include flexible organic materials, such as a thermoplastic polyurethane elastomer (TPU), a PET film, and a polyimide film.

(Application of Electrode)

The electrode of the present embodiment can be used for any appropriate application. For example, it may be used in applications where maintaining high conductivity (to reduce a decrease in initial conductivity and prevent oxidation) is required, such as electrodes or electromagnetic shielding (EMI shielding) in any suitable electric device.

The electrode is not particularly limited, and may be, for example, a capacitor electrode, a battery electrode, a biosignal sensing electrode, a sensor electrode, an antenna electrode, or the like. By using the conductive film of the present embodiment, it is possible to obtain a large-capacity capacitor and battery, a low-impedance biosignal sensing electrode, a highly sensitive sensor, and an antenna even with a smaller volume (device occupied volume).

The capacitor may be an electrochemical capacitor. The electrochemical capacitor is a capacitor using capacitance developed due to a physicochemical reaction between an electrode (electrode active material) and ions (electrolyte ions) in an electrolytic solution, and can be used as a device (power storage device) that stores electric energy. The battery may be a repeatedly chargeable and dischargeable chemical battery. The battery may be, for example, but not limited to, a lithium ion battery, a magnesium ion battery, a lithium sulfur battery, a sodium ion battery, or the like.

The biosignal sensing electrode is an electrode for acquiring a biological signal. The biosignal sensing electrode may be, for example, but not limited to, an electrode for measuring electroencephalogram (EEG), electrocardiogram (ECG), electromyogram (EMG), electrical impedance tomography (EIT).

The sensor electrode is an electrode for detecting a target substance, state, abnormality, or the like. The sensor may be, for example, but not limited to, a gas sensor, a biosensor (a chemical sensor utilizing a molecular recognition mechanism of biological origin), or the like.

The antenna electrode is an electrode for emitting an electromagnetic wave into a space and/or receiving an electromagnetic wave in the space.

The electrode of the present embodiment is preferably used as a biosignal sensing electrode in which the π-electron conjugated compound film is provided on a contact surface with a subject.

Embodiment 2: Method for Producing Electrode

Hereinafter, a method for producing an electrode in the embodiment of the present invention will be described in detail, but the present invention is not limited to such an embodiment.

The method for producing an electrode according to the present embodiment includes:

(a) preparing a precursor of a conductive film, the precursor represented by:

$$M_mAX_n$$

wherein M is at least one metal of Group 3, 4, 5, 6, or 7, X is a carbon atom, a nitrogen atom, or a combination thereof, A is at least one element of Group 12, 13, 14, 15, or 16, n is not less than 1 and not more than 4, and m is more than n but not more than 5;

(b) removing at least a part of the A atoms from the precursor using an etching liquid to obtain a first intermediate;

(c) washing the first intermediate with water to obtain a second intermediate;

(d) performing an intercalation by mixing the second intermediate with a compound for inter-layer insertion of the second intermediate to obtain a third intermediate;

(e) stirring the third intermediate in a liquid to obtain a fourth intermediate;

(f) washing the fourth intermediate with water to obtain particles;

(g) mixing the particles with a π-electron conjugated compound having at least one selected from the group consisting of an aromatic ring, a heteroaromatic ring, a conjugated diene unit, an allyl group, and a vinyl group to form particles of a layered material with the π-electron conjugated compound attached thereto; and (h) supplying the layered material with the π-electron conjugated compound attached thereto on a substrate to form a conductive film.

By this producing method, it is possible to produce an electrode capable of maintaining excellent electrode characteristics for a long period of time.

Hereinafter, each step of the production method will be described in detail.

Step (a)

First, a predetermined precursor is prepared. A predetermined precursor that can be used in the present embodiment is a MAX phase that is a precursor of MXene, and is represented by a formula below:

$$M_mAX_n$$

wherein M is at least one metal of Group 3, 4, 5, 6, or 7, X is a carbon atom, a nitrogen atom, or a combination thereof, A is at least one metal of Group 12, 13, 14, 15, or 16, n is not less than 1 and not more than 4, and m is more than n but not more than 5.

The above M, X, n, and m are as described in MXene. A is at least one element of Group 12, 13, 14, 15, or 16, is usually a Group A element, typically Group IIIA and Group IVA, more specifically, may include at least one selected from the group consisting of Al, Ga, In, Tl, Si, Ge, Sn, Pb, P, As, S, and Cd, and is preferably Al.

The MAX phase has a crystal structure in which a layer constituted by A atoms is located between two layers represented by $M_mX_n$ (each X may have a crystal lattice located in an octahedral array of M). Typically, in the case of m=n+1, the MAX phase has a repeating unit in which one layer of X atoms is disposed between the layers of M atoms of n+1 layers (these layers are also collectively referred to as "$M_mX_n$ layer"), and a layer of A atoms ("A atom layer") is disposed as a next layer of the (n+1) th layer of M atoms; however, the present invention is not limited thereto.

The MAX phase can be produced by a known method. For example, a TiC powder, a Ti powder, and an Al powder are mixed in a ball mill, and the obtained mixed powder is fired under an Ar atmosphere to obtain a fired body (block-shaped MAX phase). Thereafter, the fired body obtained is pulverized by an end mill to obtain a powdery MAX phase for the next step.

Step (b)

Etching is performed to remove at least some A atoms from the precursor using an etching liquid. The etching liquid may include, for example, one or more of HF, $H_3PO_4$, HCl, HI, and $H_2SO_4$. The etching liquid preferably contains at least one of HF (hydrofluoric acid) and $H_3PO_4$ (phosphoric acid). For example, it is also possible to perform etching by a so-called MILD method in which HCl and LiF contained in the etching liquid are reacted in a system to generate HF, but preferably, a so-called ACID method in which etching is performed with an etching liquid containing HF (hydrofluoric acid), or a method in which etching is performed with an etching liquid containing phosphoric acid is preferable. According to these methods, as compared with the MILD method, particles (MXene particles) of a flaky layered material having a large flat region with a number-average value of a feret diameter of preferably not less than 3 μm can be easily obtained, which is preferable. Other conditions for etching are not particularly limited, and known conditions can be adopted. As the etching liquid, a mixed solution of the acid and, for example, pure water as a solvent may be used. As the etching liquid, an etching liquid satisfying at least one selected from the group consisting of an HF concentration of not less than 1.5 M, an $H_3PO_4$ concentration of not less than 5.5 M, an HCl concentration of not less than 6.0 M, an $H_3PO_4$ concentration of not less than 5.5 M, an HI concentration of not less than 5.0 M, and an H2SO4 concentration of not less than 5.0 M can be used. In the etching of the A atoms, a part of the M atoms may be selectively etched together with the A atoms. Examples of the etched product obtained by the etching include slurry.

Step (c)

The etched product (first intermediate) obtained by the etching is washed with water. By performing water washing, the acid and the like used in the etching can be sufficiently removed. The amount of water mixed with the etched product and the washing method are not particularly limited. For example, stirring, centrifugation, and the like may be performed by adding water. Examples of the stirring method include stirring using a handshake, an automatic shaker, a share mixer, a pot mill, or the like. The degree of stirring such as stirring speed and stirring time may be adjusted according to the amount, concentration, and the like of the object to be treated. The washing with water may be performed one or more times. Preferably, washing with water is performed multiple times. For example, specifically, steps (i) to (iii) of (i) adding water and stirring (to the etched product or the remaining precipitate obtained in the following (iii)), (ii) centrifuging the stirred product, and (iii) discarding the supernatant after centrifugation and recovering the remaining precipitate are performed within a range of not less than 2 times, for example, not more than 15 times.

Step (d)

The treated product (second intermediate) obtained by washing with water and the compound for inter-layer insertion of the second intermediate are mixed to perform intercalation.

The compound for inter-layer insertion of the second intermediate may be of any specific type as long as it is a compound that can be inserted between the layers of the second intermediate and can be separated into the respective layers by the delamination in the next step (e). The compound for inter-layer insertion is preferably an alkali metal compound or an alkaline earth metal compound. A Li-containing compound is more preferable. As the Li-containing compound, an ionic compound in which a Li ion and a cation are bonded can be used. Examples of the Li-containing compound include halides including iodide, chloride, and fluoride, phosphates, sulfides including sulfate, nitrates, acetates, and carboxylates.

The content of the compound for inter-layer insertion in the intercalation formulation is preferably 0.001% by mass or more. The content is more preferably 0.01% by mass or more, and still more preferably 0.1% by mass or more. On the other hand, from the viewpoint of dispersibility in a solution, the content of the compound for inter-layer insertion is preferably 10% by mass or less, and more preferably 1% by mass or less.

The specific method of intercalation is not particularly limited, and for example, the compound for inter-layer insertion may be mixed with the moisture medium clay of MXene and stirred, or may be allowed to stand. For example, stirring at room temperature can be mentioned. Examples of the stirring method include a method using a stirring bar such as a stirrer, a method using a stirring blade, a method using a mixer, and a method using a centrifugal device. The stirring time can be set according to the producing scale of the electrode, and may be, for example, set to 12 to 24 hours.

Step (e)

The delamination including stirring the treated product (third intermediate) obtained by the intercalation in step (d) in a liquid such as, for example, water is carried out. By this delamination, it is possible to realize the single layer/few-layer MXene. The conditions for delamination are not particularly limited, and delamination can be performed by a known method. Examples of the stirring method include stirring using a handshake, an automatic shaker, or the like. The degree of stirring such as stirring speed and stirring time may be adjusted according to the amount, concentration, and the like of the treated product which is an object to be treated. For example, the slurry after the intercalation is centrifuged to discard the supernatant, then pure water is added to the remaining precipitate, and then stirring is performed by, for example, a handshake or an automatic shaker to perform layer separation.

In the producing method of the present embodiment, an ultrasonic treatment is not performed as delamination. As described above, since the ultrasonic treatment is not performed, particle breakage hardly occurs, and as a result, a single layer/few-layer MXene having a large plane parallel to the layer of particles, that is, a large two-dimensional plane, and a large number-average value of a feret diameter can be obtained as the layered material particles.

Step (f)

The treated product (fourth intermediate) obtained by delamination is washed with water to obtain particles of a layered material. The amount of water and the washing method are not particularly limited. For example, stirring, centrifugation, and the like may be performed by adding water. Examples of the stirring method include stirring using a handshake, an automatic shaker, a share mixer, a pot mill, or the like. The degree of stirring such as stirring speed and stirring time may be adjusted according to the amount, concentration, and the like of the object to be treated. The washing with water may be performed one or more times. Preferably, washing with water is performed multiple times. For example, specifically, steps (i) to (iii) of (i) adding water and stirring, (ii) centrifuging the stirred product, and (iii) recovering the supernatant after centrifugation are performed within a range of not less than 2 times, for example, not more than 10 times to obtain a MXene-containing supernatant. Thereafter, the MXene-containing supernatant is centrifuged to obtain an MXene-containing clay.

Step (g)

The particles obtained in the above (f) and the π-electron conjugated compound are mixed to form particles of the layered material (π-electron conjugated compound-attached particles) attached to the π-electron conjugated compound. As the π-electron conjugated compound, the compound described in the above description of the electrode can be used. The mixing method is not particularly limited. Examples thereof include a method in which a solution containing a π-electron conjugated compound and an aqueous dispersion containing particles of a layered material are prepared, and these are mixed. The solution containing the π-electron conjugated compound is preferably a solution in which the molar concentration of the π-electron conjugated compound is not less than 0.001 M and not more than 5 M. In addition, the aqueous dispersion containing the particles of the layered material is preferably particles of a layered material particle-containing slurry in which the solid content concentration of the particles of the layered material is not less than 10 mg/mL and not more than 250 mg/mL. By mixing these, particles of a layered material attached to the π-electron conjugated compound can be easily formed. The mixing method is not particularly limited, and examples thereof include hand shaking or stirring with an instrument such as a magnetic stirrer, a mechanical stirrer, a homomixer, or a homogenizer. The speed and time of stirring may be appropriately determined according to the treatment amount and the like. After the mixing, for example, the π-electron conjugated compound can be sufficiently attached to the particles of the layered material by being left for about 3 hours as described in examples. Thereafter, the formed π-electron conjugated compound-attached particles are recovered by centrifugation, filtration, or the like. The mixing and the subsequent leaving can be performed at room temperature. The mixture is preferably left to stand at not lower than 0° C. but not higher than 10° C., for example, preferably in a refrigerator.

Step (h)

The particles of the layered material attached to the π-electron conjugated compound are supplied onto the substrate to form a conductive film. The method for supplying the particles of the layered material attached to the π-electron conjugated compound onto the substrate is not limited, and examples thereof include coating, immersion, filtration, and the like. As a coating method, for example, in a case where a substrate (for example, a board) is coated with a slurry containing π-electron conjugated compound-attached particles, the coating method is not limited. Examples of the coating method include a spray coating method in which spray coating is performed using a nozzle such as a one-fluid nozzle, a two-fluid nozzle, or an air brush, a slit coating method using a table coater, a comma coater, or a bar coater, a screen printing method, a metal mask printing method, a spin coating, and coating methods by immersion, brush, or dropping.

The coating and drying may be repeated a plurality of times as necessary until a conductive film having a desired thickness is obtained. The drying and curing may be performed, for example, at a temperature of 400° C. or lower using a normal pressure oven or a vacuum oven.

As described above, the electrode according to the present embodiment may or may not have a substrate. In the case of an electrode having a substrate, a substrate formed of the above-described material can be used. For example, in a case of using a flexible organic material substrate, as described in examples described later, plasma treatment may be performed before coating to perform pretreatment for improving the hydrophilicity of the surface. In the case of an electrode having no substrate, the substrate used in this step may be a substrate for forming a conductive film, and the material is not limited. For example, when a conductive film is formed by suction filtration, a polymer film such as a membrane filter can serve as a substrate.

Although the electrode and the producing method thereof in the embodiment of the present invention have been described in detail above, various modifications are possible. It should be noted that the electrode according to the present embodiment may be produced by a method different from the producing method in the above-described embodiment, and the method for producing an electrode according to the present embodiment is not limited only to one that provides the electrode according to the above-described embodiment.

EXAMPLES

Example 1

In Example 1, an experiment was conducted to compare temporal changes in impedance between a conductive film (ascorbic acid-attached MXene film) formed of MXene particles attached to ascorbic acid as a π-electron conjugated compound and a conductive film (ascorbic acid-non-attached MXene film) formed of MXene particles (only MXene particles) which were not attached to the π-electron conjugated compound.

(Preparation of Particles (MXene Particles) of Layered Material)

MXene was produced by the following method (ACID method was used as the MAX etching method). Details are as follows.
(Production of MXene Particles Using ACID Method as MAX Etching Method)
(1) Preparation of Precursor (MAX)

A TiC powder, a Ti powder, and an Al powder (all available from Kojundo Chemical Laboratory Co., Ltd.) were put in a ball mill containing zirconia balls at a molar ratio of 2:1:1, and mixed for 24 hours. The obtained mixed powder was fired at 1350° C. for 2 hours under an Ar atmosphere. The fired body (block-shaped MAX) thus obtained was pulverized with an end mill to a maximum dimension of not more than 40 μm. In this way, $Ti_3AlC_2$ particles were obtained as a precursor (powdery MAX)
(2) Etching of Precursor Using the $Ti_3AlC_2$ particles (powder) prepared by the above method, etching was performed under the following etching conditions (ACID method) to obtain a solid-liquid mixture (slurry) containing a solid component derived from the $Ti_3AlC_2$ powder.
(Etching Conditions)

Precursor: $Ti_3AlC_2$ (sieving with a mesh size of 45 μm)
Etching liquid composition: 6 mL of 49% HF, $H_2O$ 18 mL
HCl (12M) 36 mL Amount of precursor input: 3.0 g
Etching container: 100 mL IBOY
Etching temperature: 35° C.
Etching time: 24 h
Stirrer rotation speed: 400 rpm
(3) Washing after Etching The slurry was divided into two portions, each of which was inserted into two 50 mL centrifuge tubes, centrifuged under the condition of 3500 G using a centrifuge, and then the supernatant was discarded. An operation of adding 40 mL of pure water to each centrifuge tube, centrifuging again at 3500 G, and separating and removing the supernatant was repeated 11 times. After final centrifugation, the supernatant was discarded to obtain a $Ti_3C_2T_s$-moisture medium clay.
(4) Li Intercalation The $Ti_3C_2T_s$-moisture medium clay prepared by the above method was stirred at not lower than 20° C. but not higher than 25° C. for 12 hours using LiCl as a Li-containing compound according to the following conditions of Li intercalation to perform Li intercalation. The detailed conditions of Li intercalation are as follows.
(Conditions of Li Intercalation)

$Ti_3C_2T_s$-moisture medium clay (MXene after washing) solid content 0.75 g
LiCl: 0.75 g
Intercalation container: 100 mL IBOY
Temperature: not lower than 20° C. but not higher than 25° C. (room temperature)
Time: 10 h
Stirrer rotation speed: 800 rpm
(5) Delamination The slurry obtained by Li intercalation was charged into a 50 mL centrifuge tube, centrifuged under the condition of 3500 G using a centrifuge, and then the supernatant was discarded. Next, (i) 40 mL of pure water was added to the remaining precipitate, and the mixture was stirred for 15 minutes with a shaker, then (ii) centrifuged at 3500 G, and (iii) the supernatant was recovered as a single layer/few-layer MXene-containing liquid. The operations (i) to (iii) were repeated four times in total to obtain a single layer/few-layer MXene-containing supernatant. Further, this supernatant was centrifuged under the conditions of 4300 G and 2 hours using a centrifuge, and then the supernatant was discarded to obtain a single layer/few-layer MXene-containing clay.

(Formation of Electrode Sample)

Ascorbic acid was dissolved in pure water to obtain an aqueous solution having a concentration of 10 mM. In addition, pure water was added to the single layer/few-layer MXene-containing clay to obtain a MXene aqueous dispersion slurry having a solid content concentration of 10 mg/mL or less. The mixture obtained by mixing the aqueous solution of ascorbic acid and the MXene aqueous dispersion slurry was stirred by hand shaking for 5 minutes and then left for 3 hours. Thereafter, in order to separate ascorbic acid-attached MXene from the solution, centrifugation was performed. After centrifugation, the supernatant was separated and removed, the remaining ascorbic acid-attached MXene slurry was washed three times, and then the obtained ascorbic acid-attached MXene slurry was redispersed in DI water. The ascorbic acid-attached MXene slurry was spray-coated on a flexible organic material substrate (polyimide film, size: circular shape with a diameter of 10 cm) which had been previously subjected to a plasma treatment to improve the hydrophilicity of the substrate surface. Thereafter, drying was performed in an oven to obtain an electrode sample in which an ascorbic acid-attached MXene film was formed on a flexible organic material substrate.

(Measurement of Ratio of Total Amount of π-Electron Conjugated Compound to Total Amount of Particles of Layered Material)

The ascorbic acid-attached MXene film was scraped off from the electrode sample, and the weight loss amount was measured using TG-DTA (manufacturer: thermal analyzer (device name: STA 7300, manufactured by Hitachi High-Tech Corporation.)). Then, the ratio of the total amount of the π-electron conjugated compound to the total amount of the particles of the layered material was obtained from the weighing result, and it was within the range of not less than 0.05% by mass and not more than 5% by mass.

(Measurement of Initial Value and Change Rate of Impedance)

The impedance of the electrode sample was measured by a three-pole method using Gamry Reference 600 Potentiostat/Galvanostat/ZRA. Disposable adhesive electrodes manufactured by Natus were used as a reference electrode, and ECG electrodes manufactured by Conmed were used as a counter electrode. An overvoltage was an instantaneous value of 10 mV. Values at frequencies of 10 Hz and 1 kHz were recorded. The measurement was performed with an electrode placed on the skin inside the forearm. The fixation was performed with a stretchable band or the like. Before the measurement, a portion to which the electrode was attached was wiped with cotton impregnated with ethanol for disinfection and dried, and then wiped with cotton impregnated with PBS (product name: 1×PBS, pH 7.4, manufacturer: Quality Biological), and the excess PBS was lightly removed with dry cotton.

In order to obtain the reference value, an ascorbic acid-non-attached MXene film was prepared instead of the ascorbic acid-attached MXene film, and the same measurement was performed. Then, the initial impedance (Day 0) of the ascorbic acid-non-attached MXene film was set to 1.00, the ratio of each measured impedance value to the initial impedance of the ascorbic acid-non-attached MXene film was obtained as an impedance change rate, and the temporal change of the impedance was evaluated. The initial impedances of the ascorbic acid-non-attached MXene film and the ascorbic acid-attached MXene film are shown in Table 1. In Table 1, in the measured value of the ascorbic acid-attached MXene film, the impedance change rate with respect to the initial impedance of the ascorbic acid-non-attached MXene film is also shown in parentheses. In addition, as the temporal change of the impedance, the results of measuring the impedance every day after wearing for 4 days are shown in Tables 2 and 3 are shown in Table 2 in the case of 10 Hz and in Table 3 in the case of 1 kHz. In Tables 2 and 3, the numerical values in parentheses are the change rate of each impedance with respect to the initial impedance of the ascorbic acid-attached MXene film.

TABLE 1

| | Initial impedance ($\Omega \cdot cm^2$) | |
| --- | --- | --- |
| | @10 Hz | @1 kHz |
| Ascorbic acid-non-attached MXene film | 2.80 | 1.09 |
| Ascorbic acid-attached MXene film | 3.16 (Change rate: 1.13) | 1.16 (Change rate: 1.06) |

TABLE 2

| | Impedance change rate @10 Hz | |
| --- | --- | --- |
| Elapsed date | Ascorbic acid-non-attached MXene film | Ascorbic acid-attached MXene film |
| 0 | 1.00 | 1.13 (1.00) |
| 1 | 7.54 | 1.66 (1.47) |
| 2 | 6.78 | 8.79 (7.78) |
| 3 | 33.85 | 22.99 (20.35) |

TABLE 3

| | Impedance change rate @1 kHz | |
| --- | --- | --- |
| Elapsed date | Ascorbic acid-non-attached MXene film | Ascorbic acid-attached MXene film |
| 0 | 1.00 | 0.94 (1.00) |
| 1 | 7.87 | 7.39 (7.86) |
| 2 | 6.28 | 5.90 (6.27) |
| 3 | 16.82 | 14.80 (15.74) |

As shown in Table 1, the increase in the initial impedance of the ascorbic acid-attached MXene film is suppressed to not more than 10% as compared with the ascorbic acid-non-attached MXene film. From Tables 2 and 3, in the case of the ascorbic acid-non-attached MXene film, the impedance on 3 days elapsed (Day 4) is 30 times or more the initial impedance at 10 Hz and is 16 times or more the initial impedance at 1 kHz. On the other hand, the impedance of the ascorbic acid-attached MXene film is kept about 20 times at 10 Hz and about 15 times at 1 kHz. In particular, when the initial impedance of each of the ascorbic acid-non-attached MXene film and the ascorbic acid-attached MXene film was set to 1.00, in the case of 10 Hz, the impedance increased to about 33 times on Day 4 (3 days elapsed) in the ascorbic acid-non-attached MXene film; whereas the change rate was about 20 times and was able to be reduced by −30% in the ascorbic acid-attached MXene film.

From the above results, it is considered that oxidation of the ascorbic acid-attached MXene film is suppressed. The reason why the above effect was obtained by the attachment of ascorbic acid is considered as follows. That is, the ascorbic acid acts like a vinyl carboxylic acid in an acidic solution, and has a stable conjugate base $O^-$ as a π electron of a double bond is transferred between a hydroxy group and a carbonyl group. That is, in the MXene aqueous dispersion exhibiting weak acidity, the $O^-$ group is strongly adsorbed to an edge of a positively charged MXene sheet that is the oxidation site of MXene and the carbon defects of the MXene sheet. Therefore, it is considered that MXene itself plays a role of protecting MXene from oxygen in the air and the like. In addition, since ascorbic acid also has a carbon double bond and has many π electrons, it is considered that a metal atom of MXene and a π electron of ascorbic acid interact with each other to cause a phenomenon called π bond for enhancing conductivity. In addition, it is considered that the oxidation of MXene particles by water, oxygen, or the like from the outside can be prevented by sacrificial oxidation of ascorbic acid as a reducing agent.

Example 2

In Example 2, the influence of the particle shape of the layered material on the temporal change of the impedance was examined.

An aqueous dispersion Mxene clay (10 mM) was prepared in the same manner as in Example 1. In addition, pure water was added to the single layer/few-layer MXene-containing clay (10 mM) to prepare a MXene aqueous dispersion slurry (ACID method) having a solid content concentration of not more than 10 mg/mL.

Separately from the MXene moisture medium clay (ACID method), a MXene moisture medium clay was prepared by the following method (using MILD method as MAX etching method).

(Production of MXene Particles Using MILD Method as MAX Etching Method)

(1) Preparation of Precursor (MAX)

A TiC powder, a Ti powder, and an Al powder (all available from Kojundo Chemical Laboratory Co., Ltd.) were put in a ball mill containing zirconia balls at a molar ratio of 2:1:1, and mixed for 24 hours. The obtained mixed powder was fired at 1350° C. for 2 hours under an Ar atmosphere. The fired body (block-shaped MAX) thus obtained was pulverized with an end mill to a maximum dimension of not more than 40 μm. In this way, $Ti_3AlC_2$ particles were obtained as a precursor (powdery MAX)

(2) Etching of Precursor

Using the $Ti_3AlC_2$ particles (powder) prepared by the above method, etching was performed under the following etching conditions to obtain a solid-liquid mixture (slurry) containing a solid component derived from the $Ti_3AlC_2$ powder.

(Etching Conditions)

Precursor: $Ti_3AlC_2$ (sieving with a mesh size of 45 μm)
Etching liquid composition: LiF 3.0 g $H_2O$ 7.5 mL
HCl (12M) 22.5 mL Amount of precursor input: 3.0 g
Etching container: 100 mL IBOY
Etching temperature: 35° C.

Etching time: 72 h
Stirrer rotation speed: 400 rpm (3) Washing after Etching

The slurry was divided into two portions, each of which was inserted into two 50 mL centrifuge tubes, centrifuged under the condition of 3500 G using a centrifuge, and then the supernatant was discarded. An operation of adding 40 mL of pure water to each centrifuge tube, centrifuging again at 3500 G, and separating and removing the supernatant was repeated 11 times. After final centrifugation, the supernatant was discarded to obtain a $Ti_3C_2T_s$-moisture medium clay.

(4) Delamination

Next, (i) 40 mL of pure water was added to a $Ti_3C_2T_s$-moisture medium clay, and the mixture was stirred for 15 minutes with a shaker, then (ii) centrifuged at 3500 G, and (iii) the supernatant was recovered as a single layer/few-layer MXene-containing liquid. The operations (i) to (iii) were repeated four times in total to obtain a single layer/few-layer MXene-containing supernatant. Further, this supernatant was centrifuged under the conditions of 4300 G and 2 hours using a centrifuge, and then the supernatant was discarded to obtain a single layer/few-layer MXene-containing clay.

Pure water was added to the single layer/few-layer MXene-containing clay (MILD method) of 10 mM to prepare a MXene aqueous dispersion slurry (MILD method) having a solid content concentration of not more than 10 mg/mL.

Each of the MXene aqueous dispersion slurry (ACID method) and the MXene aqueous dispersion slurry (MILD method) was spray-coated on a slide glass and dried to produce a single layer/few-layer MXene film (ACID method) and a single layer/few-layer MXene film (MILD method).

(Measurement of Initial Impedance of Each MXene Thin Film)

Using the electrode formed of each of the single layer/few-layer MXene films, the initial impedance and the impedance after being left for 2 weeks were measured at room temperature in the air. Other impedance measurement conditions were as follows. That is, the measurements were performed using a Gamry Reference 600 Potentiostat/Galvanostat/ZRA in a standard three-electrode system using a saturated Ag/AgCl reference electrode (Sigma-Aldrich Co. LLC; 3 M potassium chloride) and a carbon counter electrode. The electrochemical impedance spectroscopy (EIS) was performed in a range of 0.1 to 105 Hz and the driving voltage was in a range of 10 mV (Peak-to-peak amplitude, sine wave). The impedance at 10 Hz and 1 kHz was evaluated.

(Measurement of Number-Average Value of a Feret Diameter of Particles of Layered Material Constituting each MXene Thin Film)

In both the layered material particles obtained by etching MAX by the ACID method and the layered material particles obtained by the MILD method, the number-average value of a feret diameter was measured by removing the ascorbic acid from the ascorbic acid-attached MXene film. Specifically, the ascorbic acid-attached MXene film was subjected to ultrasonic cleaning in pure water to disperse MXene flakes not attached to ascorbic acid in pure water. An optional amount of pure water in which the MXene flakes were dispersed was dropped on a Si substrate. Then, the Si substrate supporting MXene flakes was obtained by allowing the Si substrate to stand at room temperature for 8 hours and remove moisture. Then, the MXene flakes supported on the Si substrate were photographed at a magnification of 2000 times using a scanning electron microscope (product name: S-4800) manufactured by Hitachi High-Technologies Corporation, and the obtained photograph was visually observed and confirmed. For the number-average value of a feret diameter, 50 or more particles were optionally extracted from the photograph, the Feret (Feret) constant direction tangent diameter of each particle was determined, and the average value of the number was determined as the number-average value of a feret diameter.

As a result of calculating the number-average value of a feret diameter, when the etching of MAX was performed by the MILD method, the number-average value of a feret diameter was less than 3.00 μm, and when the etching of MAX was performed by the ACID method, the number-average value of a feret diameter was 3.00 μm or more.

Even in a case of a method in which the etching of MAX is performed by the following phosphoric acid etching instead of the ACID method described in Example 1, it is considered that the MXene having a number-average value of a feret diameter of 3.00 μm or more are obtained and an effect of suppressing an increase in impedance is obtained.

(Method Including Phosphoric Acid Etching of MAX)
(Preparation of Sample)

The MXene particles were prepared by sequentially performing the following five steps described in detail below: (1) preparation of the precursor (MAX), (2) etching of the precursor, (3) washing, (4) intercalation, and (5) delamination.

(1) Preparation of Precursor (MAX)

A TiC powder, a Ti powder, and an Al powder (all available from Kojundo Chemical Laboratory Co., Ltd.) were put in a ball mill containing zirconia balls at a molar ratio of 2:1:1, and mixed for 24 hours. The obtained mixed powder was fired at 1350° C. for 2 hours under an Ar atmosphere. The fired body (block) thus obtained was pulverized with an end mill to a maximum dimension of not more than 40 μm. In this way, $Ti_3AlC_2$ particles were obtained as a precursor (MAX).

(2) Etching of Precursor

Using the $Ti_3AlC_2$ particles (powder) prepared by the above method, etching was performed under the following etching conditions to obtain a solid-liquid mixture (slurry) containing a solid component derived from the $Ti_3AlC_2$ powder.

(Etching Conditions)
 Precursor: $Ti_3AlC_2$ (sieving with a mesh size of 45 μm)
 Etching liquid composition: Aqueous solution having HF concentration of not less than 1.5 M and $H_3PO_4$ concentration of not less than 5.5 M
 Amount of precursor input: 3.0 g
 Etching container: 100 mL IBOY
 Etching temperature: 35° C.
 Etching time: 24 h
 Stirrer rotation speed: 400 rpm (3) Washing The slurry was divided into two portions, each of which was inserted into two 50 mL centrifuge tubes, centrifuged under the condition of 3500 G using a centrifuge, and then the supernatant was discarded. (i) In each centrifuge tube, 40 mL of pure water was added to the clay precipitated by centrifugation and mixed to form a slurry, (ii) a step of centrifuging again at 3500 G, and separating and removing the supernatant was repeated 11 times. After final centrifugation, the supernatant was discarded to obtain a $Ti_3C_2T_s$-moisture medium clay as a remaining precipitate.

(4) Intercalation $Li_3PO_4$, $H_3PO_4$, and pure water were added to the $Ti_3C_2T_s$-moisture medium clay prepared by the above method, and the mixture was stirred at not lower than 20° C. but not higher than 25° C. for 15 hours to perform Li intercalation. The detailed conditions of Li intercalation are as follows.

(Conditions of Li Intercalation)

$Ti_3C_2T_s$-moisture medium clay (MXene after washing) solid content 0.75 g $Li_3PO_4$: 0.68 g 85% by mass of $H_3PO_4$: 3.1 mL $H_2O$: 31.9 mL Intercalation container: 100 mL IBOY Temperature: not lower than 20° C. but not higher than 25° C. (room temperature)

Time: 15 h

Stirrer rotation speed: 800 rpm (5) Delamination

The slurry after the Li intercalation was charged into a 50 mL centrifuge tube, centrifuged under the condition of 3500 G using a centrifuge, and then the supernatant was discarded. Subsequently, an operation of adding 40 mL of pure water to the remaining precipitate from which the supernatant was removed, stirring the mixture with a shaker for 15 minutes, then centrifuging the mixture at 3500 G, and recovering the supernatant as a single layer/few-layer MXene-containing liquid was repeated 4 times to obtain a single layer/few-layer MXene-containing sample.

The results of measuring the initial impedance at 10 Hz and 1 kHz for each of the number-average value of a feret diameters are shown in Table 4. For the change rate in parentheses in Table 4, the reduction ratio of the initial impedance due to an increase in the feret diameter from less than 3.00 μm to not less than 3.00 μm is indicated by a negative value. Further, the temporal change in impedance in the case of being left in the air for 2 weeks is shown in Table 5 for the case of 10 Hz and Table 6 for the case of 1 kHz for each of the number-average value of a feret diameter of less than 3.00 μm and 3.00 μm or more.

TABLE 4

| Number-average value | Initial impedance ($\Omega \cdot cm^2$) | |
|---|---|---|
| of feret diameter | @10 Hz | @1 kHz |
| Less than 3.00 μm | 11.69 | 3.36 |
| Not less than 3.00 μm | 10.37 | 3.21 |
| | (Change rate: −11.25%) | (Change rate: −4.41%) |

TABLE 5

| | Impedance change rate @10 Hz | |
|---|---|---|
| Elapsed date | Number-average value of feret diameter is less than 3.00 μm | Number-average value of feret diameter is not less than 3.00 μm |
| 0 | 1.00 | 0.89 |
| 2 | 2.20 | 1.59 |

TABLE 6

| | Impedance change rate @1 kHz | |
|---|---|---|
| Elapsed date | Number-average value of feret diameter is less than 3.00 μm | Number-average value of feret diameter is not less than 3.00 μm |
| 0 | 1.00 | 0.96 |
| 2 | 1.60 | 1.51 |

It is found that the initial impedance can be reduced by about −10% to −5% by applying MXene having a number-average value of a feret diameter of 3.00 μm or more as shown in Table 5. This is considered to be due to the improvement of the in-plane conductivity because one MXene sheet is large when produced by the ACID method. In addition, as shown in Table 6, it is found that the impedance after 2 weeks also gradually increases as a number-average value of a feret diameter is 3.00 μm or more as shown in Table 6. This is considered to be an effect of reducing the number of oxidation sites (the number of edges) per unit area by having the number-average value of a feret diameter of 3.00 μm or more. From the ratio of the impedance change rate after 2 weeks, it can be said that this suppression effect is about to reduce the rate of impedance increase by −25%.

The MXene shown in Tables 1 and 2 was obtained by performing etching by the ACID method, and the number-average value of a feret diameter of the particles is 3 μm or more. From Tables 1 and 2, it is found that the impedance change rate can be sufficiently suppressed by using MXene particles having a large number-average value of a feret diameter and attaching ascorbic acid to the MXene particles.

The following can be said from these results. In the MXene particles (particles of a layered material), π bond can be formed only in the X-Y plane of the MXene particles, and therefore it is considered that more x bond is formed in particles having a large feret diameter. It can be said that by forming the conductive film using the particles (MXene particles) of the layered material having a large feret diameter, preferably a number-average value of a feret diameter of 3 μm or more, in which more π bonds are easily formed, in addition to the effect by attaching ascorbic acid to the MXene particles described in Example 1, the in-plane orientation as the MXene film was improved, the formation of the π bond with the ascorbic acid attached was facilitated, and the effect of suppressing the increase in impedance became more remarkable.

The electrode according to the present embodiment can be used for any appropriate application, and can be preferably used as, for example, a biosignal sensing electrode or the like.

This application is based upon and claims priority to Provisional U.S. Patent Application No. 63/223,292 filed in the United States Patent and Trademark Office on Jul. 19, 2021, the entire contents of which are incorporated herein by reference.

REFERENCE SIGNS LIST 1a, 1b Layer body ($M_mX_n$ layer)
3a, 5a, 3b, 5b Modifier or terminal T
7a, 7b MXene layer
10a, 10b, 34 MXene particles (particles of layered material)
30 Biological tissue
31 Substrate
32 Conductive film
33 π-electron conjugated compound-attached particle
35 π-electron conjugated compound
36 Bond between π electron of MXene particle and π electron of π-electron conjugated compound
37 Edge of MXene particle
38 Electrode

The invention claimed is:

1. An electrode comprising:
a conductive film which comprises:
   a material having one or plural layers of particles of a layer body represented by:

$$M_mX_n$$

wherein M is at least one metal of Group 3, 4, 5, 6, or 7, X is a carbon atom, a nitrogen atom, or a combination thereof, n is not less than 1 and not more than 4, and m is more than n but not more than 5, and
   a modifier or terminal T existing on a surface of the layer body, wherein T is at least one selected from a hydroxyl group, a fluorine atom, a chlorine atom, an oxygen atom, and a hydrogen atom; and
   a π electron conjugated compound attached to the particles, the π electron conjugated compound having at least one selected from the group consisting of a conjugated diene unit, an allyl group, and a vinyl group.

2. The electrode according to claim 1, wherein the particles are coated with the π electron conjugated compound.

3. The electrode according to claim 1, wherein a ratio of a total amount of the π electron conjugated compound to a total amount of the particles is not less than 0.001% by mass and not more than 10% by mass.

4. The electrode according to claim 1, wherein
a thickness of the particles is not less than 1 nm and not more than 30 nm, and
a total thickness of the particles of the layered material having the π electron conjugated compound attached thereto is not less than 1 nm and not more than 1 μm.

5. The electrode according to claim 1, wherein a number-average value of a feret diameter of the particles is not less than 3 μm.

6. The electrode according to claim 1, wherein the electrode is constructed as a biosignal sensing electrode.

7. An electrode comprising:
a conductive film which comprises:
   a material having one or plural layers of particles of a layer body represented by:

$$M_mX_n$$

wherein M is at least one metal of Group 3, 4, 5, 6, or 7, X is a carbon atom, a nitrogen atom, or a combination thereof, n is not less than 1 and not more than 4, and m is more than n but not more than 5, and
   a modifier or terminal T existing on a surface of the layer body, wherein T is at least one selected from a hydroxyl group, a fluorine atom, a chlorine atom, an oxygen atom, and a hydrogen atom; and a π electron conjugated compound attached to the particles, wherein the π electron conjugated compound is at least one compound selected from the group consisting of an ascorbic acid, an erythorbic acid, a dibutylhydroxytoluene, a tocopherol, a butylhydroxyanisole, a catechin and a catechin derivatives.

8. The electrode according to claim 7, wherein the particles are coated with the π electron conjugated compound.

9. The electrode according to claim 7, wherein a ratio of a total amount of the π electron conjugated compound to a total amount of the particles is not less than 0.001% by mass and not more than 10% by mass.

10. The electrode according to claim 7, wherein
a thickness of the particles is not less than 1 nm and not more than 30 nm, and
a total thickness of the particles of the layered material having the π electron conjugated compound attached thereto is not less than 1 nm and not more than 1 µm.

11. The electrode according to claim 7, wherein a number-average value of a feret diameter of the particles is not less than 3 µm.

12. The electrode according to claim 7, wherein the electrode is constructed as a biosignal sensing electrode.

* * * * *